Sept. 12, 1950     G. O. GARIS     2,521,784
FLOWMETER INDICATOR
Filed Oct. 17, 1946
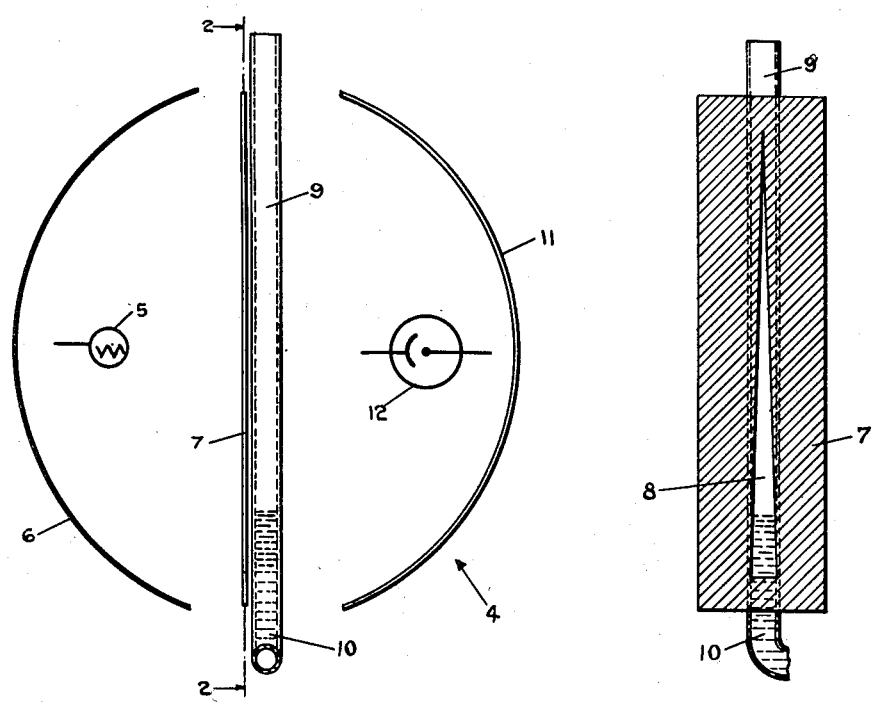
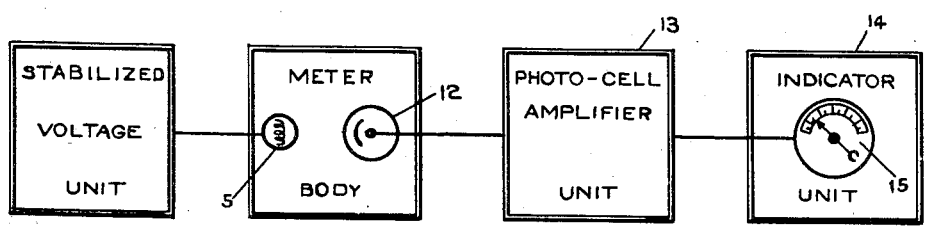
INVENTOR.
GORDON O. GARIS.
BY
ATTORNEYS.

Patented Sept. 12, 1950

2,521,784

UNITED STATES PATENT OFFICE 2,521,784

FLOWMETER INDICATOR

Gordon O. Garis, Cumberland, Md., assignor to Celanese Corporation of America, a corporation of Delaware Application October 17, 1946, Serial No. 703,755

7 Claims. (Cl. 73—398)

This invention relates to a novel flowmeter and relates more particularly to a square-root compensated flowmeter adapted to be employed for measuring the rate of flow of fluids in a pipe wherein the rate of flow determined by the primary measuring element employed is indicated by, and is a function of, a pressure differential in the system.

One of the most widely employed types of flowmeters is that which depends for its action on a primary element which measures the difference in static pressure, or head, produced in the system by a constricted portion or throat in the pipe through which the fluid is flowing. Different forms of primary elements indicating a differential pressure are utilized and among these are the Venturi tube, the flow nozzle, the orifice plate and the Pitot tube. All of these measuring devices depend for their action upon the fact that fluids flowing through a pipe under pressure gain speed and lose head in passing through converging pipes or constrictions and conversely, lose speed and gain head when passing through diverging pipes. This phenomenon is a result of the law of conservation of energy. The loss in hydrostatic head at the throat or converging portion of the pipe is transferred into velocity head in order to maintain an energy balance throughout the system. Thus, where the area of the up-stream end of the tube and the area of the throat or constricted portion are known and the difference in static pressure between that at the throat or constricted portion and that at the wider portion is measured by means of a suitable manometer, the linear velocity of the fluid in the pipe may then be calculated and translated into the volume of liquid flowing through the pipe. The manometer may be filled with any suitable liquid, such as mercury. As is well known, the flow through such differential pressure elements varies as, or is a function of, the square root of the differential pressure across the throat or constriction in the pipe line. A manometer designed to indicate the differential pressure will, therefore, express the actual flow on a square root scale since the rate of flow is proportional to the square root of the height of the mercury column in the manometer. Meters reading directly on a square root scale are undesirable because of the fact that the spacing of the lines in the lower portion of the scale is cramped with the same increment of head at this point representing a larger number of flow units than is the case at a maximum flow.

It is accordingly, an important object of this invention to provide a differential pressure flowmeter which is compensated for the square root relationship of the rate of flow and the height of the liquid column in the manometer, whereby the rate of flow may be read directly on an indicator scale graduated in decimal units.

Another object of this invention is the provision of a differential pressure flowmeter in which all moving parts cooperating with the primary element for converting the changes in manometer liquid level into a mechanical movement indicating a rate of flow are eliminated.

A further object of this invention is the provision of a differential pressure flowmeter wherein the rate of flow indicated by said metering device may be converted into an electric current which may be telemetered or transmitted from the primary measuring element to a secondary recording or indicating instrument situated at a distance from the primary element.

Other objects of this invention will appear from the following detailed description and the accompanying drawing.

In the drawing wherein a preferred embodiment of my invention is shown,

Fig. 1 is a side elevational view, showing a pair of parabolic reflectors, a liquid-filled manometer therebetween, a light source, a light valve responsive to fluctuations in the manometer liquid level and a photoelectric cell on which light from said light source may impinge, Fig. 2 is a front elevational view, taken along the line 2—2 in Fig. 1, showing the light valve and a liquid-filled manometer leg, and Fig. 3 is a schematic diagram of the electrical circuit of the novel flowmeter of my invention.

Like numerals indicate like parts throughout the several views of the drawing.

Referring now to the drawing, and more particularly to Fig. 1, the flowmetering device of my invention, generally indicated by reference numeral 4, comprises a stabilized light source 5 suitably mounted at the focus of a highly polished parabolic reflector 6 so that light rays emitted from said light source will be reflected in a substantially parallel condition therefrom and will impinge on a light valve 7. Light valve 7, which is provided with a suitably shaped and proportioned slot 8 of predetermined configuration, is mounted in front of one leg of a transparent U-tube manometer 9 which contains an opaque liquid 10, such as mercury or the like. U-tube manometer 9 is suitably connected to the primary element of a pressure differential flowmeter device, so that the level of the mercury column in the manometer will be responsive to the pressure differential in the system caused by the flow of fluid and will vary with the velocity of the fluid passing through the pipe.

The parallel light rays which pass through slot 8 of light valve 7 also pass through that portion of transparent U-tube manometer 9 which is not filled with mercury and strike a second, highly-polished parabolic reflector 11. Reflector 11 has a photoelectric cell 12 at the focus thereof so that all the parallel rays striking said parabolic reflector 11 are gathered together and are thus focussed for maximum effect on cell 12. A current is generated in photoelectric cell 12 whose amperage is directly proportional to the intensity of the light reaching it. This current is amplified to a suitable level, employing a suitable electronic circuit of linear charactersistics, which circuit is indicated by reference numeral 13, in the manner well-known to the art. The amplified current is transmitted or telemetered to a current-responsive indicator unit 14 which converts the current variations into a measurement of the fluid flow in any desired units on a suitably graduated and calibrated scale 15.

In accordance with my invention, slot 8 in light valve 7 is so proportioned that the area uncovered by the vertical movement of the mercury column 10, due to the differential pressure caused by the fluid flow, is proportional to the square root of the height of said liquid column. The light passing through said slot 8 will, therefore, be directly proportional to the flow and the current generated by the light, when focussed on photoelectric cell 12, will also be directly proportional to the rate of fluid flow. The amplification of the current generated in said photoelectric cell 12 is effected, as stated, by the use of an electronic circuit of linear characteristics and the amplified current may then be telemetered to any desired indicating device, e. g. an ammeter, where the rate of flow given by the electric current is converted to a torque or rotary angle which is shown on a properly calibrated decimal scale. The most minute primary response of the liquid column may thus be transmitted without distortion as an electric current over any distance. In addition, the rate of flow given by the electric current generated may be recorded on suitable electrical instruments placed in the electrical circuit and then integrated to yield a total flow value, in the manner well-known to the art.

The parallel light rays which pass to either side of the light valve 7 also strike the parabolic reflector 11 and are focussed by said reflector onto the photoelectric cell 12 causing a current to flow therein. Since the intensity of the light rays passing to either side of the light valve 7 does not vary, the current induced in the photoelectric cell 12 by said light rays will be constant and will affect only the zero adjustment of the flowmeter.

The advantages of my novel square root compensated flowmetering device lie not only in the fact that it is devoid of moving parts but also in the fact that it is highly sensitive, easily constructed and calibrated. Furthermore, the metering device may be placed at a remote point in the system with the indicating, recording and integrating devices at a centrally located position convenient for easy reading by an operative.

It is to be understood that the foregoing detailed description is given merely by way of illustration and that many variations may be made therein without departing from the spirit of my invention.

Having described my invention, what I desire to secure by Letters Patent is:

1. In a square root compensated fluid flowmeter, the combination with a source of light rays of a manometer of uniform diameter containing an opaque liquid set in the path of said light rays, a light valve adjacent thereto through which the light rays are adapted to pass, said light valve comprising a body having an opening of predetermined configuration whereby the light passing through the light valve is governed by the level of the opaque liquid in the manometer, and means for converting the light rays passing through the manometer and light valve into an electric current whose amperage varies with the rate of fluid flow.

2. In a square root compensated fluid flowmeter, the combination with a source of light rays and means for parallelizing said light rays of a transparent manometer of uniform diameter containing an opaque liquid set in the path of said parallelized light rays, a light valve adjacent thereto through which the parallelized light rays are adapted to pass, said light valve comprising a body having an opening of predetermined configuration whereby the light passing through the light valve is governed by the level of the opaque liquid in the manometer, and means for converting the parallelized light rays passing through the manometer and light valve into an electric current whose amperage varies with the rate of fluid flow.

3. In a square root compensated fluid flowmeter, the combination with a source of light rays and means for parallelizing said light rays of a transparent manometer of uniform diameter containing an opaque liquid set in the path of said parallelized light rays, a light valve adjacent thereto through which the parallelized light rays are adapted to pass, said light valve comprising a body having an opening of predetermined configuration the area of which is proportional to the square root of its height whereby the light passing through the light valve area is governed by the level of the opaque liquid in the manometer, and means for converting the parallelized light rays passing through the manometer and light valve into an electric current whose amperage varies with the rate of fluid flow.

4. In a square root compensated fluid flowmeter, the combination with a source of light rays and means including a parabolic reflector having the light source at the focus thereof whereby said light rays are parallelized, of a transparent manometer of uniform diameter containing an opaque liquid set in the path of said parallelized light rays, a light valve adjacent thereto through which the parallelized light rays are adapted to pass, said light valve comprising a body having an opening of predetermined configuration the area of which is proportional to the square root of its height whereby the light passing through the light valve is governed by the level of the opaque liquid in the manometer, and means for converting the parallelized light rays passing through the manometer and light valve into an electric current whose amperage varies with the rate of fluid flow.

5. In a square root compensated fluid flowmeter, the combination with a source of light rays and means including a parabolic reflector having the light source at the focus thereof whereby said light rays are parallelized, of a transparent manometer of uniform diameter containing an opaque liquid set in the path of said parallelized light rays, a light valve adjacent thereto through which the parallelized light rays are adapted to pass, said light valve comprising a body having an opening of predetermined configuration the area of which is proportional to the square root of its height whereby the light passing through the light valve is governed by the level of the opaque liquid in the manometer, and means including a second parabolic reflector for collecting and focussing those parallel light rays passing through the manometer and light valve, and a photoelectric cell at the focus of said second parabolic reflector for converting the light rays into an electric current whose amperage varies with the rate of fluid flow.

6. In a square root compensated fluid flowmeter, the combination with a source of light rays and means including a parabolic reflector having the light source at the focus thereof whereby said light rays are parallelized, of a transparent manometer of uniform diameter containing an opaque liquid set in the path of said parallelized light rays, a light valve adjacent thereto through which the parallelized light rays are adapted to pass, said light valve comprising a body having an opening of predetermined configuration the area of which is proportional to the square root of its height whereby the light passing through the light valve is governed by the level of the opaque liquid in the manometer, a second parabolic reflector for collecting and focussing those parallel light rays passing through the manometer and light valve, a photoelectric cell at the focus of said second parabolic reflector for converting the light rays into an electric current whose amperage varies with the rate of fluid flow, and means for amplifying and converting the varying electric current into a torque indicating the rate of fluid flow.

7. In a square root compensated fluid flowmeter, the combination with a source of light rays and means including a parabolic reflector having the light source at the focus thereof whereby said light rays are parallelized, of a transparent manometer of uniform diameter containing an opaque liquid set in the path of said parallelized light rays, a light valve interposed between the light source and manometer through which the parallelized light rays are adapted to pass, said light valve comprising a body having an opening of predetermined configuration the area of which is proportional to the square root of its height whereby the light passing through the light valve is governed by the level of the opaque liquid in the manometer, a second parabolic reflector for collecting and focussing those parallel light rays passing through the manometer and light valve, a photoelectric cell at the focus of said second parabolic reflector for converting the light rays into an electric current whose amperage varies with the rate of fluid flow, and means for amplifying and converting the varying electric current into a torque indicating the rate of fluid flow.

GORDON O. GARIS.

REFERENCES CITED

The following references are of record in the file of this patent:

UNITED STATES PATENTS

| Number | Name | Date |
|---|---|---|
| 1,907,105 | Haworth | May 2, 1933 |
| 2,149,735 | Henderson | Mar. 7, 1939 |
| 2,277,285 | Woodling | Mar. 24, 1942 |

Certificate of Correction

Patent No. 2,521,784　　　　　　　　　　　　　　　　　　　　September 12, 1950

GORDON O. GARIS

It is hereby certified that error appears in the printed specification of the above numbered patent requiring correction as follows:

Column 4, line 44, strike out the word "area";

and that the said Letters Patent should be read as corrected above, so that the same may conform to the record of the case in the Patent Office.

Signed and sealed this 28th day of November, A. D. 1950.

[SEAL]

THOMAS F. MURPHY,
*Assistant Commissioner of Patents.*